United States Patent [19]
Smith

[11] Patent Number: 6,081,804
[45] Date of Patent: Jun. 27, 2000

[54] METHOD AND APPARATUS FOR PERFORMING RAPID AND MULTI-DIMENSIONAL WORD SEARCHES

[75] Inventor: Rodney David Smith, Pleasant Grove, Utah

[73] Assignee: Novell, Inc., Provo, Utah

[21] Appl. No.: 08/208,773

[22] Filed: Mar. 9, 1994

[51] Int. Cl.[7] ..................................................... G06F 17/21
[52] U.S. Cl. ........................................ 707/5; 707/3; 707/6
[58] Field of Search ....................... 395/600; 364/DIG. 1, 364/DIG. 2; 707/3, 5, 6, 500

[56] References Cited

U.S. PATENT DOCUMENTS

| | | | |
|---|---|---|---|
| 4,870,568 | 9/1989 | Kahle et al. ............................. | 364/200 |
| 5,201,048 | 4/1993 | Coulter et al. .......................... | 395/600 |
| 5,265,065 | 11/1993 | Turtle ....................................... | 395/600 |
| 5,278,980 | 1/1994 | Pedersen et al. ....................... | 395/600 |

OTHER PUBLICATIONS

APS Text Search and Retrieval Examiner Training Manual Oct. 21, 1992.

*Primary Examiner*—Jean R. Homere
*Attorney, Agent, or Firm*—Dinsmore & Shohl LLP

[57] ABSTRACT

A computer system and method for performing rapid and multi-dimensional word searches upon specification of a search space and specification of a search query. The search space identifies a plurality of objects, whether directly or through means of an index, each object comprising a plurality of words. The search query comprises a plurality of words and a plurality of attributes, the attributes defining the conditions imposed on the search. The search query is processed in two steps. In the first step, a parser evaluates the search query and creates a data structure based on the words and the attributes in the search query and the scope of an index, if the search space includes an index. The parser allows a rich syntax of attributes as well as complex (multi-dimensional) combinations of attributes. In the second step, an evaluator generates a list of objects in the search space which satisfy the search query by scanning the search space with the data structure. The evaluator scans object data where the search space identifies at least one object; scans index data where the search space identifies at least one index of objects and the indexes are sufficient to resolve the search query; and scans complex combinations of object data and index data where index data alone is insufficient to resolve the search query.

10 Claims, 15 Drawing Sheets

SEARCH TABLE

SYSTEM FOR USING THE PRESENT INVENTION

Flow Diagram of the Process

Flow Diagram of the Parsing Phase

Flow Diagram of the Get Statement Procedure

Flow Diagram of the Get Item Procedure

Flow Diagram of the Build
Optimized Table Procedure

Flow Diagram of the
Evaluating Phase

Flow Diagram of the Evaluate Object Procedure

Flow Diagram of the
Test Operators Procedure

1000 "/13 /sent A..(B|C)"

1001
| A | B | C | OR | ORDER |
|---|---|---|----|-------|
|1010|1014|1018|1022|1024|

1012
A = found, 8
Operand1 = A
Operand2 = TestOps (B)

1016
B = found, 20
Operand1 = B
Operand2 = TestOps (C)

1020
C = found, 22
Operand1 = C
Return (C)

Operand2 = C
Operator = OR
Operand1 = found; 20, 22
Return (Operand1)

Operand2 = found; 20, 22
Operator = ORDER
Operand1 = found; (8, 20)
Return (Operand1)

1002 This object is in the search space, but it already has been scanned.

1004 This search query checks to see if A is in the same sentence, within thirteen words, and precedes either B or C.
1008

1006 This object is in the search space, and it will be scanned next.

FIGURE 10
OBJECT EVALUATION

SEARCH TABLE

1120 — LEAD CHARACTER TABLE

|    | 0 | 1 | 2 | 3 | 4 | 5 | 6 | 7 | 8 | 9 | A | B | C | D | E | F |
|----|---|---|---|---|---|---|---|---|---|---|---|---|---|---|---|---|
| 00 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 | 0 | 0 | 0 |
| 30 | 0 | 0 | 0 | 0 | 0 | 0 | 0 | 0 | 0 | 0 | 0 | 0 | 0 | 0 | 0 | 0 |
| 40 | 0 | 1 | 1 | 0 | 0 | 0 | 0 | 0 | 0 | 0 | 0 | 0 | 0 | 0 | 0 | 1 |
| 50 | 0 | 0 | 0 | 0 | 0 | 0 | 0 | 0 | 0 | 0 | 0 | 0 | 0 | 0 | 0 | 0 |
| 60 | 0 | 1 | 1 | 0 | 0 | 0 | 0 | 0 | 0 | 0 | 0 | 0 | 0 | 0 | 0 | 1 |
| 70 | 0 | 0 | 0 | 0 | 0 | 0 | 0 | 0 | 0 | 0 | 0 | 0 | 0 | 0 | 0 | 0 |
| 80 | 0 | 0 | 0 | 0 | 0 | 0 | 0 | 0 | 0 | 0 | 0 | 0 | 0 | 0 | 0 | 0 |
| 90 | 0 | 0 | 0 | 0 | 0 | 0 | 0 | 0 | 0 | 0 | 0 | 0 | 0 | 0 | 0 | 0 |
| A0 | 0 | 0 | 0 | 0 | 0 | 0 | 0 | 0 | 0 | 0 | 0 | 0 | 0 | 0 | 0 | 0 |
| B0 | 0 | 0 | 0 | 0 | 0 | 0 | 0 | 0 | 0 | 0 | 0 | 0 | 0 | 0 | 0 | 0 |
| C0 | 0 | 0 | 0 | 0 | 0 | 0 | 0 | 0 | 0 | 0 | 0 | 0 | 0 | 0 | 0 | 0 |
| D0 | 0 | 0 | 0 | 0 | 0 | 0 | 0 | 0 | 0 | 0 | 0 | 0 | 0 | 0 | 0 | 0 |
| E0 | 0 | 0 | 0 | 0 | 0 | 0 | 0 | 0 | 0 | 0 | 0 | 0 | 0 | 0 | 0 | 0 |
| F0 | 0 | 0 | 0 | 0 | 0 | 0 | 0 | 0 | 0 | 0 | 0 | 0 | 0 | 0 | 0 | 0 |

FIGURE 12
LEAD CHARACTER TABLE

WORD TABLE

OPERATOR TABLE

| GRANULARITY TABLE | |
|---|---|
| Number of Granularities | 3 |
| Bitmask of Granularities | sent; para; doc |
| Granularity #1 | sent |
| Pointer to Reset List | • |
| Granularity #2 | para |
| Pointer to Reset List | • |
| Granularity #3 | doc |
| Pointer to Reset List | • |
| Number of Granularity #1 | 2 |
| Flag Pointer | |
| Flag Pointer | |
| Number of Granularity #2 | 2 |
| Flag Pointer | |
| Flag Pointer | |
| Number of Granularity #3 | 1 |
| Flag Pointer | |

FIGURE 15
GRANULARITY TABLE

METHOD AND APPARATUS FOR
PERFORMING RAPID AND MULTI-
DIMENSIONAL WORD SEARCHES

BACKGROUND OF THE INVENTION

1. Field of the Invention

The present invention relates generally to information management, and particularly, to computerized search technology based on boolean search criteria. A computer system and method for performing rapid and multi-dimensional word searches upon specification of a search space and specification of a search query are disclosed.

2. Description of the Prior Art

Developments in electronic digital computers over the past thirty years have furthered the accessibility of information in previously unknown ways. Recently, this information explosion has included the proliferation of personal computers, the linking of computers through networks, exponential improvements in the propagation of electronic data, and related events. As the amount and availability of information increases, management and retrieval of that information becomes an important and complex problem.

Computer searching involves the searching of a search space, a group of objects stored in electronic form, for particular target data. Many prior art computer searching systems identify target data in the form of boolean search queries. In such a query, words and attributes are combined in a linear order to describe the conditions imposed on the search. For example, a user may execute a search to find all documents in which the terms "black cat" and "white mouse" both appear. The animal references are both "words" to find in the search, and the document restriction and the conjunctive condition are both "attributes" or conditions imposed on the search.

Because most computer systems are arranged with hierarchies of files and folders, objects to search are often files. Other types of searches, though, are also common. For example, word processing software often allows a user to find certain text within a particular document. The main restriction is that the search space is greater than or equal in size to found data items. Beyond this restriction, though, computer searching accommodates multiple scales.

In general, users of computer searching systems engage in two types of searches, research searches and specific searches. In research searches, the user lacks knowledge about the expected result of the search but wants to scan all possibly relevant objects in a database to acquire knowledge about a certain topic. To an extent, these types of searches benefit from broad search criteria that try to find as many relevant objects as possible. By contrast, in specific searches, the user has prior knowledge of the desired search results but does not know where the particular objects are located. The user seeks to find the objects without excessive human intervention. These searches typically utilize the most narrowing criteria that a search system supports.

As the base of electronically-stored information grows, two related problems arise in computer searching technology. First, there is the problem of search specificity. As the amount of electronically-stored information grows and more files mentioning a certain topic exist, objects that are not the desired target of searches must be distinguished from objects which are. To address this problem, well-focused search criteria are needed. Although prior art systems of boolean searching allow for some specificity in acceptable search queries, support of more operators and allowance of finer selection criteria are desirable. Yet, as the number of permissible combinations of overlapping attributes increases, the complexity of the computer code required to execute such searches grows at an explosive rate. This complexity has prevented previous attempts at multi-dimensional searches.

Other prior art methods of computer searching technology also fail to answer the need for narrower search criteria. Fuzzy logic searching is one alternative to boolean searching. In fuzzy logic, each object is assigned a weight, and objects are retrieved according to their weight with respect to a search query, where the query usually consists of a linear ordering of key words or a sentence from which key words are extracted. Fuzzy logic, however, encourages multiple hits (i.e., found objects) in a search results list and fails to make the fine textual distinctions that are only available through complex attribute searching. The result is that the user still makes manual determinations of which hits are relevant to the search query.

Accordingly, the present invention is directed to solving this problem by disclosing a means allowing a rich syntax of attributes as well as complex (multi-dimensional) combinations of attributes. The search method disclosed allows for rapid, multi-dimensional searches, supporting simultaneous combinations of different attributes. This method greatly advances the art of computer searching with respect to specific searches by allowing greater particularity in search specificity. Also, by allowing multiple attributes, the capabilities of research-type search systems are expanded.

A second problem in computerized search technology is speed. As the quantity of information available through electronic means increases, the time required to search the information also increases. To improve search speed, data indexes are used to catalogue information about a search space in a coherent manner allowing for efficient access and retrieval. By collecting information related to a particular search space in an annotated form such as an index, a search is more quickly executed.

However, searches using an index are limited by the very thing that gives them speed, the index. Because an index is statically created, it cannot support dynamic searching for words or attributes not included in the index. Quite often, index data lacks the detail required to resolve a particular search. When such a condition arises, prior art methods of computerized search technology use index data only or use object data only and ignore the other form of data. This technique of using either index data or object data is inefficient, though, as index data may have sufficient detail to resolve most, but not all of the conditions imposed by a particular search query.

Accordingly, the present invention is directed to solving this problem by disclosing a means for scanning complex combinations of object data and index data where index data alone is insufficient to resolve the search query. By allowing intelligent index use, the present invention improves the efficiency of both research searches and specific searches, greatly advancing the art.

SUMMARY OF THE INVENTION

The present invention is a computer system and method for performing rapid and multi-dimensional word searches. In general, the invention discloses means for performing more specific and faster searches than prior art computer searching systems based on boolean search queries. To function, two items must be specified, a search space and a search query. The search space identifies a plurality of objects, where each object comprises a plurality of words. The search space identifies objects directly, through identifying an index, or a combination thereof. The search query comprises a plurality of words and a plurality of attributes, where the attributes define conditions imposed on the search.

After specification of the search space and the search query, the search is processed in two steps. In the first step, a parser evaluates the search query and creates a data structure based at least in part on the words and the attributes in the search query and the scope of an index, if the search space includes an index. The parser means in the present invention improves over prior art by permitting a rich syntax of attributes as well as complex (multi-dimensional) combinations of attributes. An example of the type of search query that could not heretofore be processed is "/sent /3 Bill..(cat¦hat)". This search query describes a search to find all objects where the word "Bill" precedes either the word "cat" or the word "hat" and the words are also within the same sentence and within three words of each other. The ability to process these three levels of search restriction simultaneously imposed on two operands is not seen in prior art computer searching systems.

In the second step of the process, an evaluator generates a list of objects by scanning the search space with the data structure. The list represents those objects in the search space which satisfy the search query. The evaluator means in the present invention improves over prior art by permitting the scanning of complex combinations of object data and index data, thus improving the speed of searching. The evaluator scans object data where the search space identifies at least one object; scans index data where the search space identifies at least one index of objects and the indexes are sufficient to resolve the search query; and scans complex combinations of object data and index data where index data alone is insufficient to resolve the search query.

BRIEF DESCRIPTION OF THE DRAWINGS

The foregoing advantages of the present invention are apparent from the following detailed description of the preferred embodiment of the invention with reference to the drawings, in which:

FIG. 10 shows an example of object evaluation for a representative search query and object.

FIG. 12 shows the state of the lead character table, an element of the search table data structure, after completion of the parsing phase for a representative search query.

FIG. 15 shows the state of the granularity table, an element of the search table data structure, after completion of the parsing phase for a representative search query.

DETAILED DESCRIPTION OF THE PREFERRED EMBODIMENT

1. System for Using the Present Invention

Figure 1:
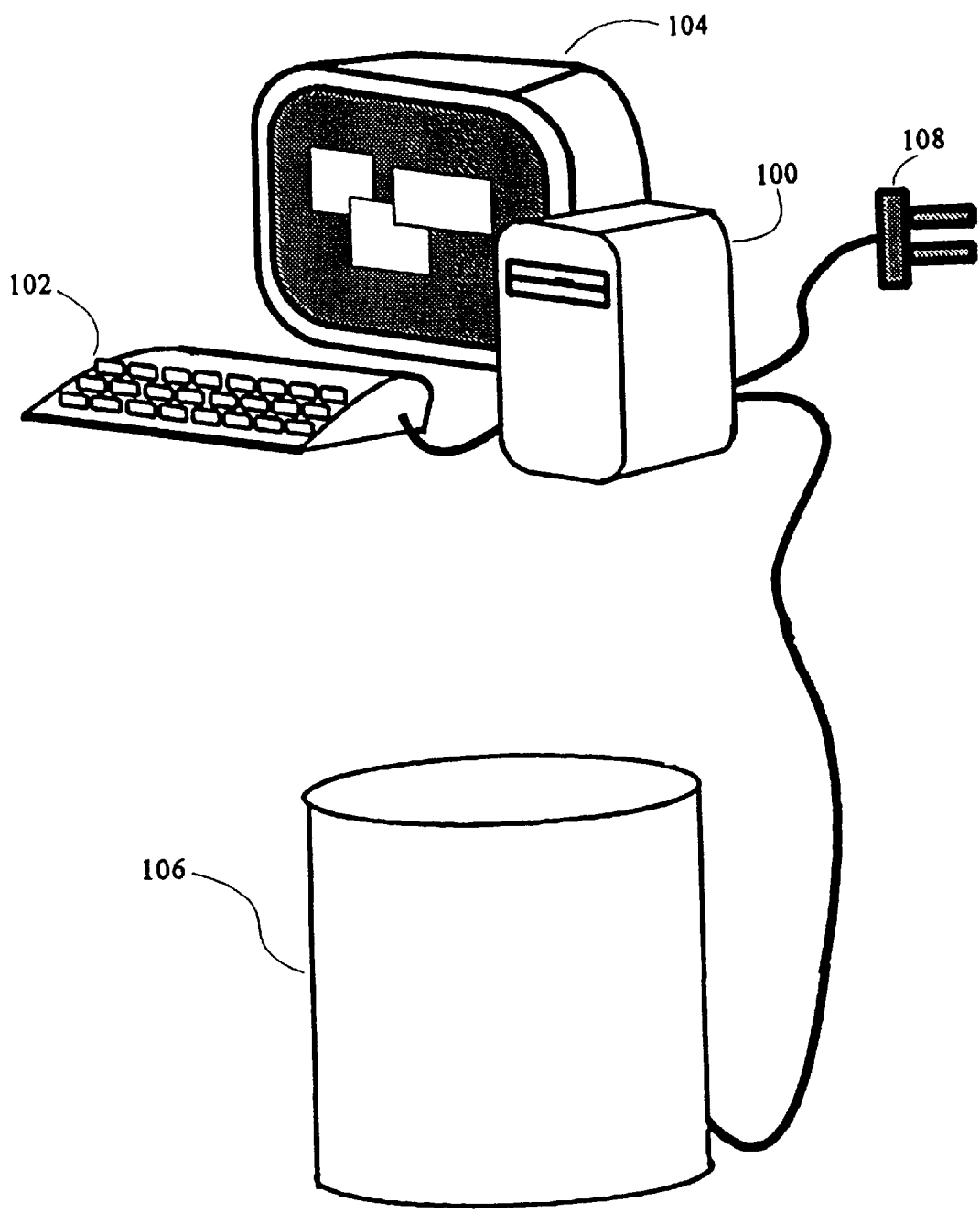
FIG. 1 shows the configuration of a computer system apparatus to which the present invention applies.

Referring to FIG. 1, the configuration of a computer system apparatus to which the present invention applies is disclosed. The system includes: a central processing unit 100, in which the process for rapid and multi-dimensional searching is executed; an input device 102, such as a keyboard, from which the user specifies search spaces and search queries; an output device 104, such as a CRT monitor, on which the results of searches are displayed; a mass storage device 106, such as a central file server, on which the objects to be searched are stored; and a power source 108, such as alternating current, from which power for the electronic elements is derived.

2. The Process Disclosed in the Present Invention

Figure 2:
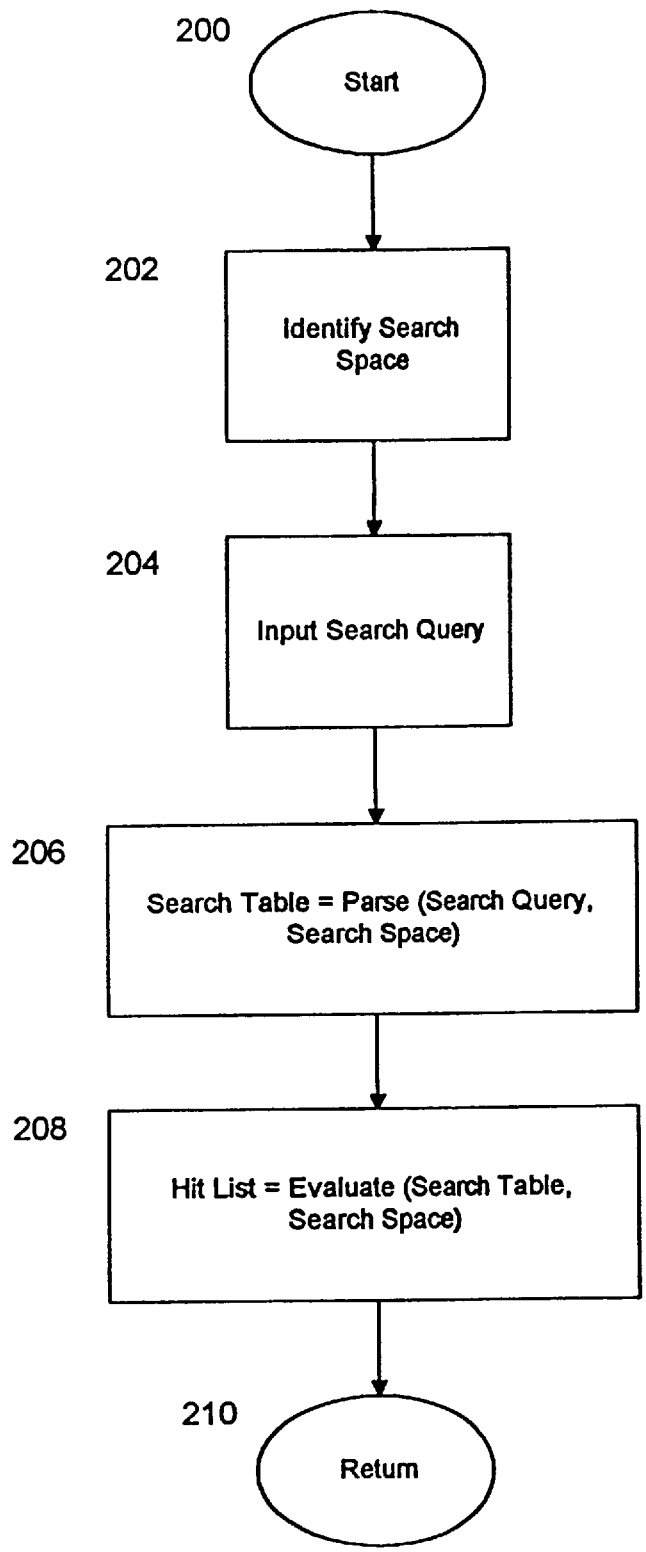
FIG. 2 shows a flow diagram of the process for rapid and multi-dimensional word searching.

Referring to FIG. 2, the flow diagram of the process for rapid and multi-dimensional word searching is disclosed. The process consists of four steps. First, the user specifies a search space 202. Second, the user specifies a search query 204. In the third step, the main procedure calls (i.e., invokes) a separate procedure for parsing 206. The parsing procedure is passed two items, the search space from 202 and the search query from 204; it returns one item, a search table. As described more fully below, the search table has pointers to the search table data structure. Although a separate procedure for parsing is not necessary, programming convention suggests the use of procedures and top-down program design. See, e.g., Walter J. Savitch, PASCAL: An Introduction to the Art and Science of Programming, at 87–108 (1984). Here and elsewhere in the preferred embodiment, this convention is followed. In the fourth and final step of the process, the main procedure calls a separate procedure for evaluating 208. The evaluating procedure is passed two items, the search table from 206 and the search space from 202; it returns one item, a hit list. The hit list identifies objects from the search space that satisfy the search query.

3. Specification of a Search Space

In the first step of the process for rapid and multi-dimensional word searching, the user specifies a search space 202. The search space identifies the objects to be searched. In the preferred embodiment, the search space may consist of files, directories, disks, indexes, and any and all combinations of the foregoing. Thus, if the user wants to search only a particular file on the mass storage device 106, he would enter the name of that file on the input device 102. If the user wants to search a particular directory, he would enter the name of the directory, such as "c:\dir\*.*". If the user wants to search the entire disk or an index of a particular group of files, this information is similarly specified.

4. Specification of a Search Query

In the second step of the process for rapid and multi-dimensional word searching, the user identifies a search query 204. The search query specifies the desired results of the search. In the preferred embodiment, the search query is a boolean phrase of expressions, words, operators, and switches. Expressions are mere combinations, contained with parentheses ("(" and ")") of other words, operators, switches, and nested expressions. The word is the basic element of the search query in the preferred embodiment. The use of the term "word", though, should not be confused with the dictionary concept of the term. In the patent, a word is defined by rule. In the preferred embodiment, words are defined by tables and are dependent on particular file formats. A good definition, though, is that a word consists of the bytes contained between two bytes representing white space. Thus, although dictionary words will be patent words, a number of non-dictionary words are also patent words, such as numbers and dates. Specifying a search query for a particular word is simple. For example, if the user wants to find all files in a search space which contain "cat", the search query would consist of the single word "cat". The preferred embodiment also allows the use of "wildcard" characters, including the question mark (?) to match any single character and the asterisk symbol (*) to match zero or more characters. Thus a search of "cat*" would find instances of "cat", "catch", "catastrophe", etc.

Alternatively, the user may want to find all files in a search space which do not contain "cat". In this instance, an operator is needed. An operator adds attributes to the search. The preferred embodiment supports four operators: NOT, ORDER, AND, and OR. The operators NOT, AND, and OR have boolean meanings, and they are represented by name (in upper or lower case) or by an exclamation point (!) for NOT, the ampersand symbol (&) or a blank space for AND, and the upright bar symbol (|) for OR. For example, if a user wants to search a search space for objects containing the words "cat" and "hat", he would enter "cat AND hat", "cat and hat", or "cat & hat" as the search query. The ORDER operator also has its meaning common to boolean searching, that of precedence. Thus, if a user wants to search a search space for objects where the word "cat" precedes the word "hat", he would enter "cat .. hat" as the search query.

If the user, however, only wants to find instances where the word "cat" precedes the word "hat" by five or fewer words, then a new attribute must be introduced. This new attribute is a "within" limitation, one example of the class of items known as switches. All switches in the preferred embodiment are preceded by the forwardslash character (/) to distinguish them from words. To search for the forwardslash character as a word, it must be enclosed in quotation marks ("/"). This quotation rule applies generally. To search for a reserved word, such as an operator, or to search for a group of words or a word phrase, such as the expression "apples are red", quotation marks are used.

Switches add attributes to the search. They impose conditions on the words and operators that follow them, and multiple switches are permitted. Where a switch is not specified in the search query, a default value is used in executing the search. The name, function, and default value of suggested switches, all of which are supported in the preferred embodiment of the invention, include: (1) "/wildcard", where the asterisk symbol (*) and the question mark (?) in a search query are treated as wildcard characters in searching (default); (2) "/nowildcard", where the asterisk symbol (*) and the question mark (?) in a search query are treated as characters in searching; (3) "/nocase", where searching is case insensitive in that upper and lower case characters in a search query match each other in the search space (default); (4) "/case", where searching is case sensitive in that upper and lower case characters in a search query must be exactly found in the search space; (5) "/wpcase", where searching is semi-case sensitive in that upper case characters in a search query match only upper case characters in the search space but lower case characters in a search query match both upper and lower case characters in the search space; (6) "/noprefix", where words in a search query must match words in the search space exactly (default); (7) "/prefix", where words in a search query are treated as prefixes and, thus, the word "cat" in a search query would match the word "catch" in the search space; (8) "/entire", where words in a search query may be found anywhere in an object in the search space (default); (9) "/firstpage", where words in a search query must be found on the first page of an object (which includes page break definitions) in the search space; (10) "/text_only", where words in a search query must be found in the text portion of an object in the search space; (11) "/summary", where words in a search query must be found in the summary portion of an object in the search space; (12) "/{name}" or "/summary={name}", where words in a search query must be found in the named field in the summary portion of an object in the search space; (13) "/line", where words in a search query must be found within the same line in an object in the search space; (14) "/sentence", where words in a search query must be found within the same sentence in an object in the search space; (15) "/paragraph", where words in a search query must be found within the same paragraph in an object in the search space; (16) "/page", where words in a search query must be found on the same page in an object in the search space; (17) "/hardpage", where words in a search query must be found within the same section, bounded by hard pages, in an object in the search space; (18) "/document", where words in a search query must be found within the same document in the search space (default); (19) "/field", where words in a search query must be found within the same field in an object in the search space; (19) "/record", where words in a search query must be found within the same record in an object in the search space; (20) "/{number}" or "/within={number}", where words in a search query must be found within the specified number of words of each other in an object in the search space; (21) "/noscan", where scanning after an index search is not performed, even if the search query warrants scanning; and (22) "/forms", where morphological variations of words in the search query are found in objects in the search space. Of course, this list is not exhaustive, nor do all of these switches necessarily require implementation. Other switch definitions are possible and likely, as switches should be tailored to particular application demands.

5. Description of the Search Table Data Structure

Before examining the remaining steps of the process, it is instructive to describe the search table data structure. FIG. 11 through FIG. 15 show the state of the search table data structure after completion of the parsing phase for a representative search query, "/sent /3 alpha..beta /para /0 omega". This search query describes a search to find all objects where the word "alpha" precedes the word "beta" and these words are within the same sentence and within three words of each other and in the same paragraph as the word "omega". As seen from FIG. 11, six components comprise the search table data structure in the preferred embodiment. These components include the search table 1100, the lead character table 1120, the word table 1140, the operator table 1160, the granularity table 1180, and the search query in string form 1198.

a. The Search Table

The search table 1100 is a collection of pointers to the other components in the search table data structure. The search table includes pointers to the lead character table 1102, the word table 1104, the operator table 1106, the granularity table 1108, and the search query in string form 1110. The search table differs from the search table data structure. The search table consists only of the pointers; the search table data structure consists of all the data. The search table improves the performance of the process by providing pointers that make data readily accessible.

b. The Lead Character Table

The lead character table 1120 is a 256-byte array that contains information about the lead characters of the words in a search query. FIG. 12 shows an example of the lead character table. The lead character of a word is its first character. For example, the lead character of "cat" is "c", and the lead character of "192" is "1". The lead character table improves search performance by providing a resource from which the relevance of a particular word in the search space is quickly determined. If the first character of the word currently reviewed in an object in the search space does not have a lead character matching one of the characters in the lead character table, the scanned word is not relevant to the search, and the process continues with the next word in the scanned object.

The lead character table 1120 is arranged as a 256-byte array of boolean values to correspond to the ASCII characters 0–255, or in hexadecimal, 00–FF. Those persons skilled in the art recognize ASCII as a standard form for assigning values to characters. For example, the upper case "A" is ASCII-code 65 and the lower case "a" is ASCII-code 97. The lead character table is constructed by assigning the value of the array element equal to "true" for each lead character of a word in a search query. Where a search query specifies that a search is case insensitive, both the upper and lower case forms of lead characters are included in the array. Thus, if a search query includes "apple" and the search is case insensitive, array elements 65 and 97 are set equal to "true".

c. The Word Table

Figure 13:
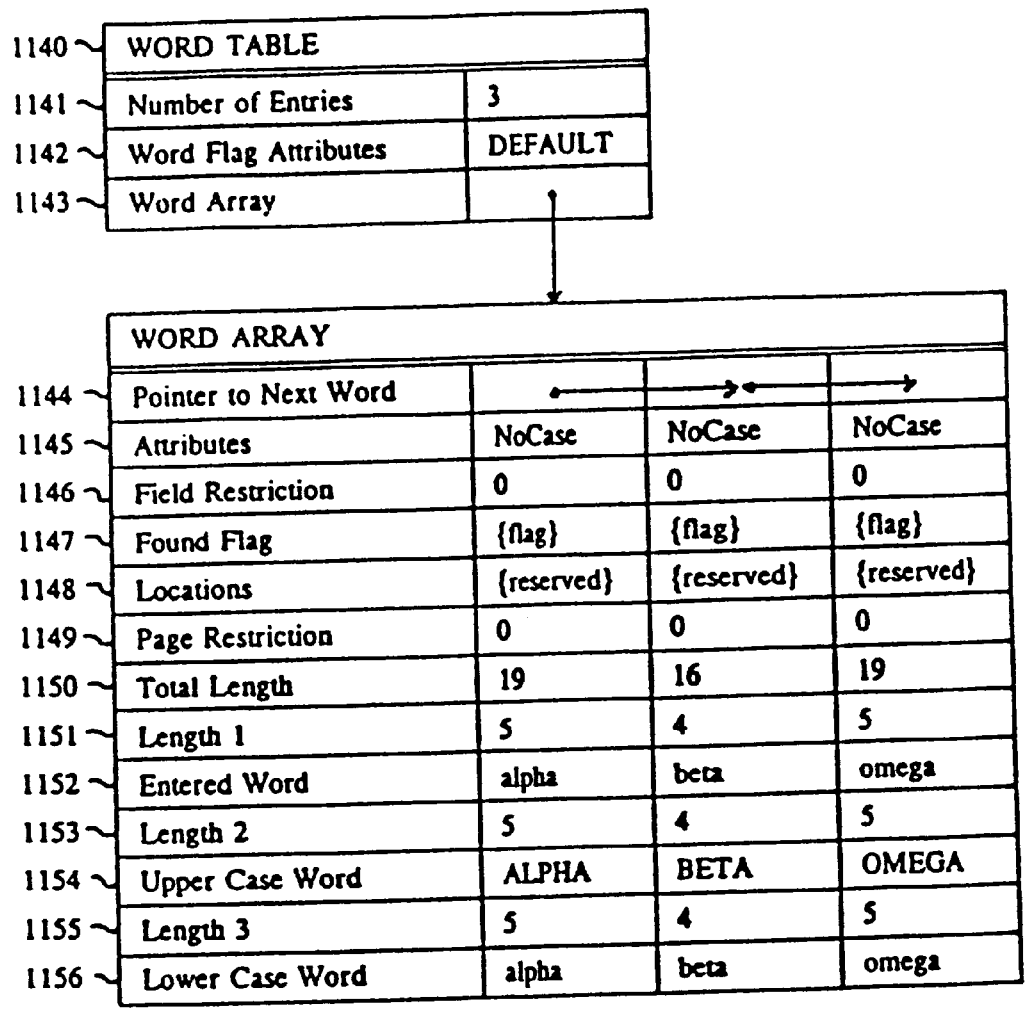
FIG. 13 shows the state of the word table, an element of the search table data structure, after completion of the parsing phase for a representative search query.

The word table 1140 contains information on the words in a search query. FIG. 13 shows an example of the word table. It consists of three parts. An integer 1141 represents the number of total entries in the word table. At least one byte of bitmask data 1142 represents attribute flags applicable to the entire set of words in the search query. In this bitmask data, a binary one represents a set flag and that the attribute applies; a binary zero shows that a flag is not set and that the attribute does not apply. The preferred embodiment supports a flag to indicate that zero, at least one, or all the words in the search query must be found on the first page of an object in the search space; a flag to indicate that the search query is the asterisk (*) wildcard character; a flag to indicate that at least one word in the search query has a wildcard character that should be interpreted as a normal character; and a flag to indicate that at least one word in the search query is a date. Of course, this list is not exhaustive, nor do all of these flags necessarily require implementation. Other flag definitions are possible and likely, as flags should be tailored to particular application demands.

The third part of the word table is an array of the words from the search query 1143. This array has one entry for each word in the search query, and it is further subdivided into a number of unique elements. A pointer 1144 points to the next entry in the array to improve access speed. At least one byte 1145 provides bitmask data representing attribute flags applicable to a word. In the preferred embodiment, flags are supported to indicate the case sensitivity of the word; whether zero, one, or more wildcard characters are present in the word; whether the word may be found anywhere, only in the summary portion, or only in the text portion of an object in the search space; whether the word is involved in a "within" construction; whether wildcard characters are treated as characters instead of wildcards; and whether the word represents a date. Again, other flag definitions are expected in different embodiments. The next element of the word array is an integer 1146 which provides a field number where the word must be found in an object in the search space. If no field is specified, this entry takes a default value of zero. A flag 1147 indicates whether the word has been found in an object in the search space. This flag is only used in the evaluating phase of the overall process. Similarly, a locations pointer 1148 is provided and used in the evaluating phase to process the ORDER operator. An integer 1149 indicates within what number of pages the word must be found in an object in the search space. If no restriction is present, this entry takes a default value of zero. Strings of the word as entered by the user 1152, in all upper case 1154, and in all lower case 1156 are provided for each word in the word array. In addition, the length of this collective string is stored in an integer 1150 and the lengths of the individual strings are stored in integers 1151, 1153, and 1155 for each of the words in the word array. Keeping the lengths in the array improves speed by eliminating the need to determine them each time they are needed in the evaluating phase.

d. The Operator Table

Figure 14:
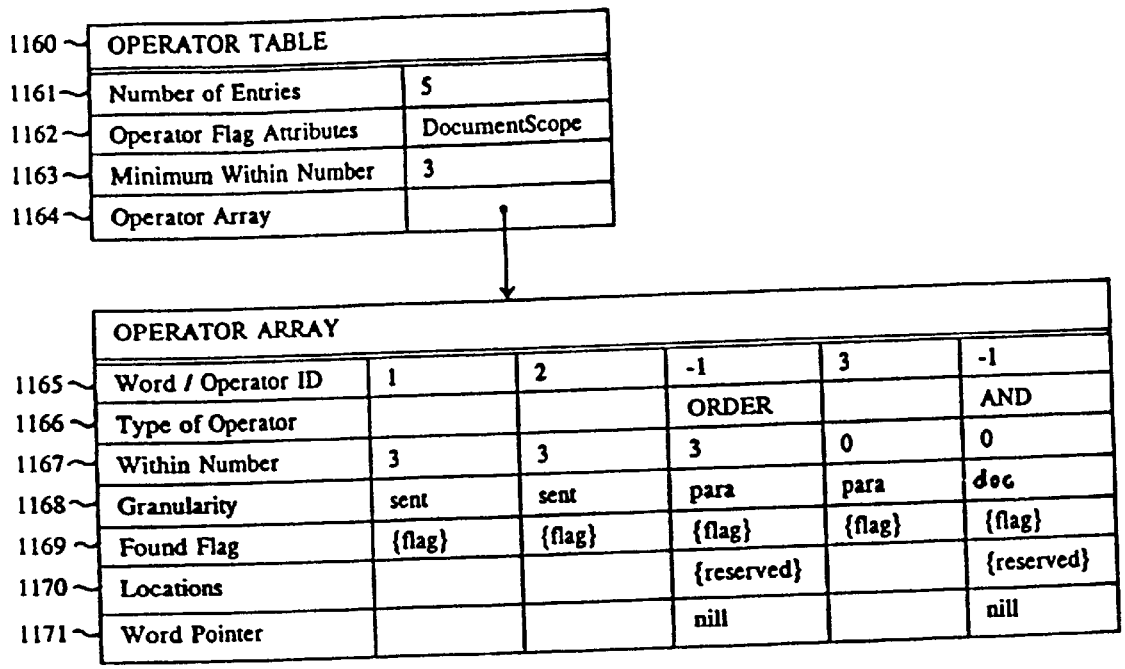
FIG. 14 shows the state of the operator table, an element of the search table data structure, after completion of the parsing phase for a representative search query.

The operator table 1160 contains information on the operators and the operands (i.e., the words) in a search query. FIG. 14 shows an example of the operator table. It consists of four parts. An integer 1161 represents the number of total entries in the operator table. At least one byte of bitmask data 1162 represents attribute flags applicable to the entire set of entries in the operator table. The preferred embodiment supports flags to indicate whether the NOT or ORDER operators are present in the search query; whether an index-identified search space needs to be bumped up to the object level; and whether the summary fields, the text of an object, or the entire object needs to be searched. Other flag definitions are expected in different embodiments. An integer 1163 specifies the minimum "within" number contained in any "/within" switch in the search query. If this switch is not present, this entry takes a default value of zero.

The fourth part of the operator table is an array of the operand and word entries in the table 1164. This array has one entry for each operand and word in the search query, and it is further subdivided into a number of unique elements. An integer 1165 specifies the entry number of the word from the word array 1143, or if the entry is an operator, it is set to a default value of negative one. A type variable 1166 specifies whether the entry is the AND, OR, NOT, or ORDER operator, or it is set to a default blank value if the entry is a word. An integer 1167 specifies the "within" number applied to the entry. If an entry is not subject to a "/within" switch, it takes a default value of zero. A type variable 1168 specifies the granularity to which each entry is subject. A "granularity" refers to the bounds within which words from a search query must be found and operators from a search query must be satisfied in an object in the search space. The switches numbered thirteen through nineteen defined in the discussion of search queries 204 are supported in the preferred embodiment. For example, switch thirteen, "/line", specifies that words must be found within the same line. The default granularity level is "/document", where words must be found and operators must be satisfied at the object level. A flag 1169 indicates whether an entry has been found in an object in the search space. If the entry is a word, this flag is a pointer to the corresponding flag in the word array. This flag is only used in the evaluating phase of the overall process. Similarly, a locations pointer 1170 is provided and used in the evaluating phase to process the ORDER operator. Finally, a pointer 1171 points to the corresponding word in the word array 1143, or if the entry is an operator, it is set to a default value of nill.

e. The Granularity Table

The granularity table 1180 contains information on the granularities in a search query. FIG. 15 shows an example of the granularity table. It consists of four parts. An integer 1181 represents the number of granularities in a search query. At least one byte of bitmask data 1182 represents attribute flags signifying which granularities are present in a search query. Thus, if a search query contains the "line" level granularity, the bit corresponding to this granularity is set to one; otherwise, the bit keeps a default value of zero. A bit exists for each granularity recognized by the system. For each granularity actually present in the search query, further information is specified in the third part of the granularity table, a list of granularities present 1183. In this list, there is at least one byte of bitmask data 1184 identifying the granularity type and a pointer 1185 pointing to the start of a granularity reset list 1186, the fourth part of the granularity table. In the granularity reset list, there is an integer 1187 representing the number of words and operands subject to the granularity as well as a list of pointers 1188 to the found flags for words 1147 and the found flags for operands 1169 subject to the granularity. This structure is important in the evaluating phase of the overall process.

f. The Search Query String

The final component of the search query data structure is the search query in string form 1198. This component is a character string representing the original specification of the search query from step 204.

6. The Parsing Phase of the Process

Figure 3:
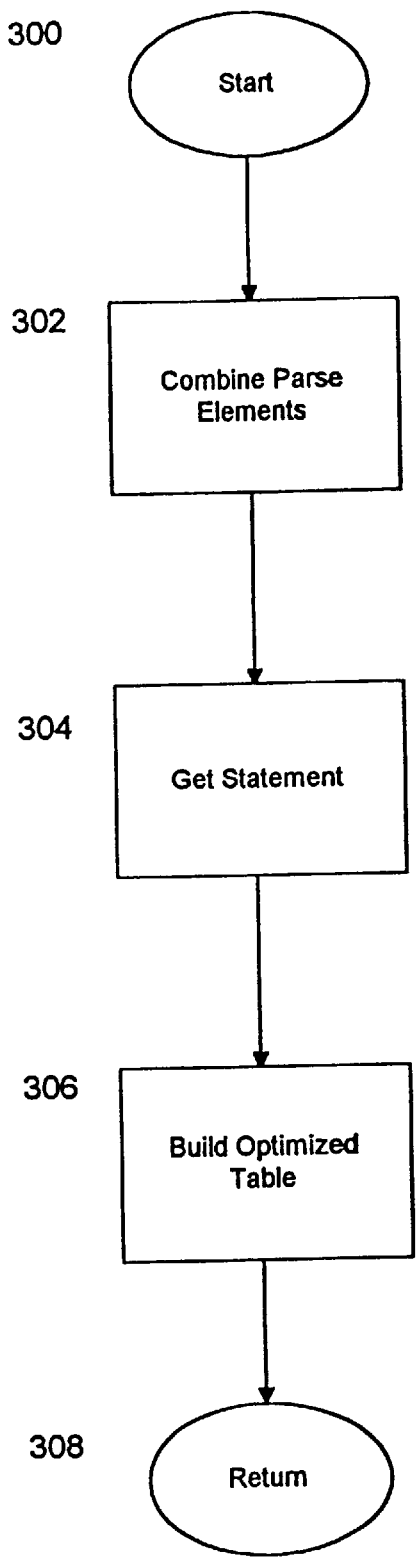
FIG. 3 shows a flow diagram of the parsing phase of the process for rapid and multi-dimensional word searching.

In the third step of the process for rapid and multi-dimensional word searching, the search table data structure is built in the parsing phase 206. Referring to FIG. 3, a flow diagram of the parsing process is shown. The process consists of three steps. The first step of parsing is combining the parse elements 302. This step involves analyzing the search space and search query and combining and simplifying the components of the search query as necessary for optimal parsing. In the second step of parsing, the get statement procedure is called 304. Get statement is a recursive procedure that parses the optimized search query, building temporary word, operator, and granularity lists. The final step is building an optimized search table data structure 306. This data structure is constructed from the word, operator, and granularity lists and other temporary data collected during the first two steps of parsing.

a. Get Statement Procedure

Figure 4:
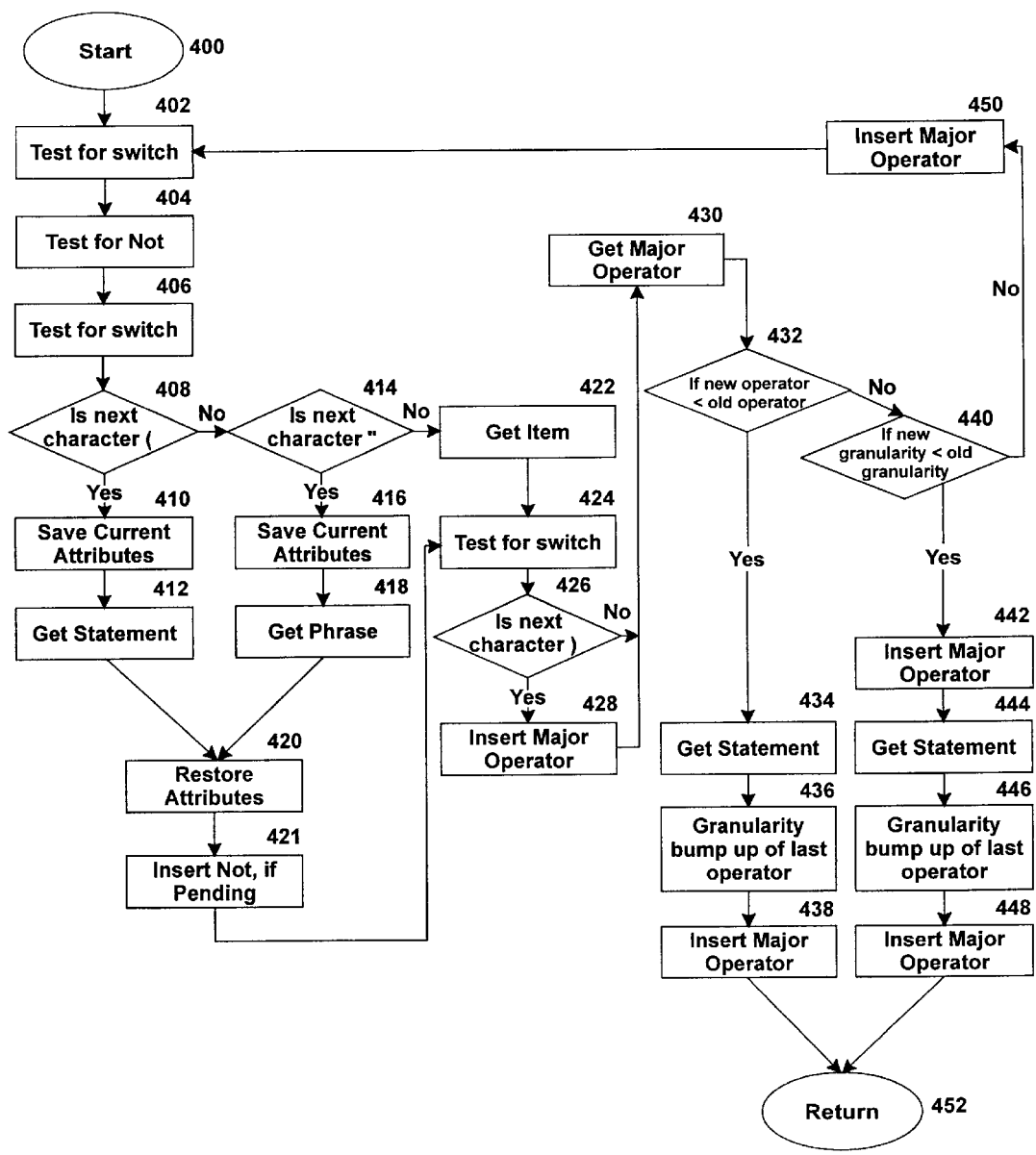
FIG. 4 shows a flow diagram of the get statement procedure, an element of the parsing phase.

FIG. 4 shows a flow diagram of the get statement procedure. Step 402 determines whether the next character in the search query buffer is the forwardslash symbol (/). If so, the following item, including any trailing assignment (e.g., the "=5" in "/within=5"), is interpreted as a switch. A switch is processed by setting an appropriate attribute to reflect the switch property. Later, when a word or operator is read from the search query buffer, the attributes are used to assign values to elements in the search table data structure that depend on attribute values. Step 404 determines whether the next item in the search query buffer is the NOT operator. If so, the pending operator is set to NOT and a flag is set to indicate that the search query contains a NOT operator. Step 406 again tests for a switch and follows the logic of step 402.

Step 408 determines whether the next character in the search query buffer is the open parentheses ("("). If so, the following items constitute an expression and the branch to step 410 is taken. Step 410 saves the current attribute settings. Later, after a close parentheses (")") is encountered in the search query buffer, the stored attribute settings are recalled. Thus, sets of parentheses work not only on boolean operators but also on other attributes. Step 412 makes a recursive call to get statement, in which the nested expression is parsed. After program control is returned from the recursive call to get statement, the attributes are restored to their previous setting in step 420. If a NOT operator is pending, step 421 inserts it in the operator list, as described more fully below in step 428.

If the open parentheses ("(") is not encountered in step 408, program control transfers to step 414. Step 414 determines whether the next character in the search query buffer is an open quotation mark ("). If so, the following items constitute a phrase and the branch to step 416 is taken. Step 416 saves the current attribute settings as in step 410. Step 418 then calls the procedure "get phrase", which reads the phrase and the close quotation mark ("). Step 420 restores the attributes to their previous setting. If a NOT operator is pending, step 421 inserts it in the operator list, as described more fully below in step 428. If in step 414 the next character was not an open quotation mark ("), program control transfers to step 422. Step 422 calls the get item procedure, which is detailed in a separate section below and shown in the flow diagram in FIG. 5. After execution of either step 420 or 422, program control transfers to step 424.

Step 424 again tests for a switch and follows the logic of step 402. Step 426 determines whether the next character in the search query buffer is a close parentheses (")"). If so, the process must have just returned from a recursive call to get statement, and a pending operator, if one exists, is inserted into the operator list at step 428. The operator list is a temporary data structure created during the first stage of parsing. Later, it is converted into the operator table. In addition to inserting the pending operator, its attributes are stored in the operator list, the count of operators is incremented, and flags are set which indicate whether an index, if one is selected in the search query, can fully resolve the search query or whether scanning is required to resolve the query. If the branch to step 428 is not taken or after it is complete, program control resumes at step 430.

Step 430 determines whether the next item in the search query buffer represents an AND, OR, ORDER, or NOT operator. If an operator is not present, the program assumes the existence of the AND operator, the default operator. If the ORDER operator is present, a flag is set to indicate that the search query contains an ORDER operator.

Step 432 tests whether the new operator is tighter binding than the old operator in that the new operator comes before the old operator in the order of operations. In the preferred embodiment, the order of operations from most to least binding is NOT, ORDER, AND, and OR. If the new operator is tighter binding and there is no change of granularity between the new and old operators, program control is transferred to step 434, in which the get statement procedure is called recursively and passed the new operator as a parameter. The result is that the new operator will be added to the operator list before the old operator. This result ensures that the items in the operator list maintain post-fix order. For example, in the search query "alpha OR beta AND gamma", the AND operator is tighter binding than the OR operator; the search query is equivalent to "alpha OR (beta AND gamma)". This search query is stored in the operator list in correct post-fix order as "alpha; beta; gamma; AND; OR" by means of step 434.

If the branch from step 432 to 434 is not taken, the new operator is either the same as the old operator or less binding than the old operator. In either case, program control moves to step 440. Step 440 tests whether the new granularity level is smaller than the old granularity level. The "sentence" granularity level, for example, is smaller than the "paragraph" granularity level. If the new granularity level is smaller, program control transfers to step 442, where the old operator is inserted into the operator list. The result is that the addition of the new operator to the operator list is postponed. Step 444 then calls the get statement procedure recursively.

After returning from the recursive call to get statement in either step 434 or 444, the granularity level of the last operator inserted into the operator list is "bumped" to the granularity level of the next operator in steps 436 and 446, respectively. This "bumping" of operator granularity level permits mixing of granularity levels and attributes. In general, granularities mark times for resetting the found flags associated with entries in the operator table. For words, found flags 1147 are reset to false at the end of each granularity. For example, in the search query "/line alpha beta", at the end of each line, the found flags for "alpha" and "beta" are set to false prior to processing the next line of data. Thus, if "alpha" is found on a first line but "beta" is found on a second line, the search process avoids the erroneous conclusion that "alpha" and "beta" occur on the same line. The found flags for operators 1169 are more complex, as they accommodate mixed granularity levels. For example, in the search query "/page alpha beta /line gamma delta", the search process must remember that "gamma" and "delta" were found on the first line of a page, even if "alpha" and "beta" are found at the end of the page. To provide this limited memory, operators use the granularity levels of prior operators, as established in step 446. Thus, even if the found flags for "gamma" and "delta" are set to false after each line, the fact they both occurred on the first line is not lost until the end of the page, as the associated AND operator uses the page granularity level. Following steps 436 or 446, a pending operator, if one exists, is inserted into the operator list at steps 438 or 448, respectively. These steps follow the insertion logic of step 428. The final step in these two sub-branches is to return to the calling routine in step 452.

If the branch from step 440 to 442 is not taken, the new granularity level is either the same as or larger than the old granularity level. In either case, program control moves to step 450, in which a pending operator, if one exists, is inserted into the operator list. This step follows the insertion logic of step 428. In addition, step 450 sets flags pertaining to index information, as in step 428. The process then loops back to its first step at step 402.

b. Get Item Procedure

Figure 5:
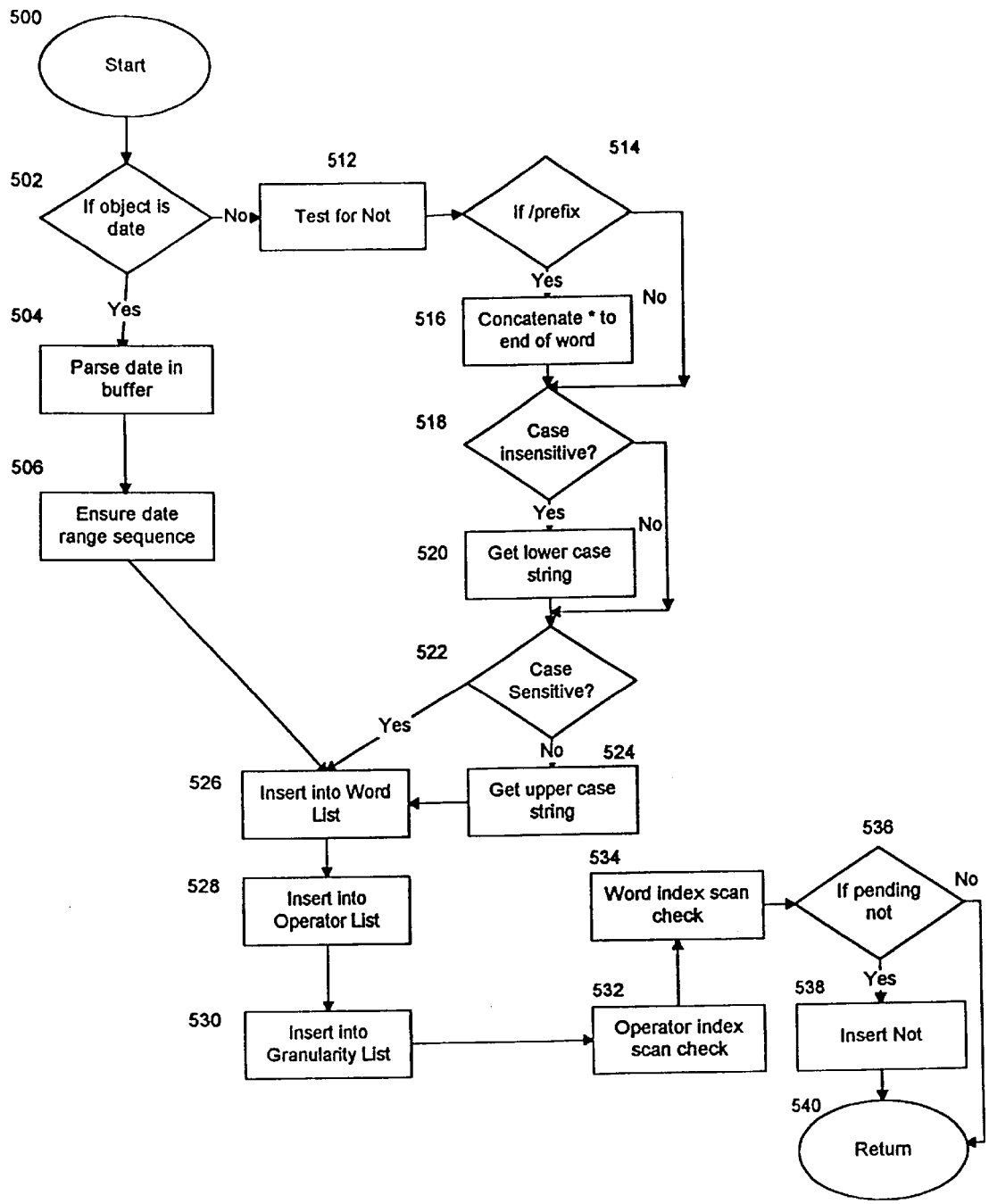
FIG. 5 shows a flow diagram of the get item procedure, an element of the parsing phase.

FIG. 5 shows a flow diagram of the get item procedure. The get statement procedure calls the get item procedure in step 422. The get item procedure reads a word and its associated data from the search query buffer and adds this information to the search table data structure.

Step 502 determines whether the next item is a date. If so, program control branches to step 504, in which the date is parsed into a standard form. Step 506 checks the date for validity, including a check that a "from" date precedes a "to" date for date range specifications. Program control then transfers to step 526, discussed below.

If the branch from step 502 to 504 is not taken, the next item is not a date and program control transfers to step 512.

Step 512 determines whether the next item in the search query buffer is the NOT operator. If so, the pending operator is set to NOT and a flag is set to indicate that the search query contains a NOT operator, as in step 404. Step 514 determines whether the "/prefix" attribute is enabled. If so, the asterisk (*) wildcard is appended to the end of the item in step 516. Step 518 determines whether the case insensitivity attribute is enabled. If so, the word is converted to lower case in step 520 in preparation for insertion into the word table. Step 522 determines whether the case sensitivity attribute is enabled. If so, the word is converted to upper case in step 524 in preparation for insertion into the word table.

Step 526 inserts the word into the word list. The word list is a temporary data structure created during the first stage of parsing. Later, it is converted into the word table. In addition to inserting the pending word, word attributes are stored in the word list and the word count is incremented. Step 528 inserts the word into the operator list. Insertion in the operator list is as specified in step 428. Step 530 inserts the word into the granularity list. Like the word and operator lists, the granularity list is a temporary data structure created during the first stage of parsing. Later, it is converted into the granularity table. Unlike the operator list, the granularity list only contains words. Operators are not added to the granularity list prior to building the granularity table.

Step 532 performs an operator index scan check. In this step, several flags are set which guide the evaluating phase of the process where the search space is an index. In particular, flags are set to indicate whether the index can fully resolve the search query and whether the index is the same granularity as the search query. Step 534 performs a word index scan check. In this step, further flags are set to guide the evaluating phase of the process and to determine the extent of relevance of the index data. Step 536 determines whether a NOT operator is pending. If so, the NOT operator is inserted in step 538, as in step 421. The final step is to return to the calling routine in step 540.

c. Build Optimized Table Procedure

Figure 6:
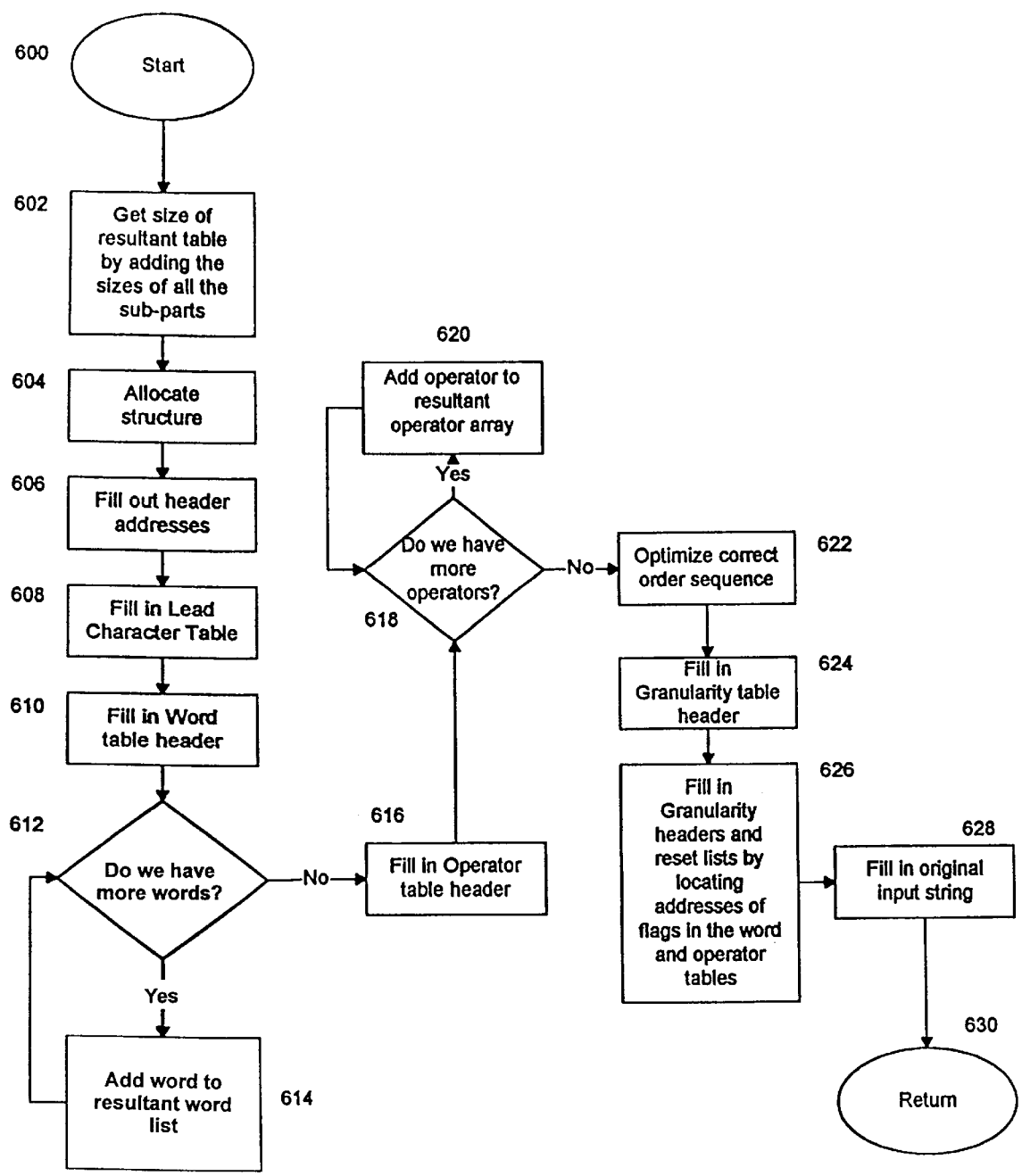
FIG. 6 shows a flow diagram of the build optimized table procedure, an element of the parsing phase.

FIG. 6 shows a flow diagram of the build optimized table procedure. Although the data could be left in the form of the linked lists produced in the get statement procedure, the data is packed into one structure to improve the efficiency of the evaluating phase of the process. By packing the data into a contiguous data structure, the principle of locality posits that access to such closely grouped data is quicker.

Step 602 calculates the size of the search table data structure, as based on the number of operators, the number and lengths of words, the attributes, and the number of granularities. Step 604 allocates memory for the search table data structure. Step 606 constructs the search table 1100. Step 608 constructs the lead character table 1120. Step 610 constructs the header information in the word table 1140, including items 1141 and 1142. Steps 612 and 614 construct the word array 1143 by looping through the word list and adding an entry in the array for each word in the list. The data from the word list is packed into array elements 1144 through 1155 for each word entry. Step 616 constructs the header information in the operator table 1160, including items 1161 through 1163. Steps 618 and 620 construct the operator array 1164 by looping through the operator list and adding an entry in the array for each operator in the list.

Step 622 examines the post-fix operator table and optimizes its sequence to ensure that all ORDER operators, if possible, appear first in complex search queries. This results in improved efficiency in the evaluating phase. The method used for swapping order is that if the last operator is not an ORDER operator, the right operator is an ORDER operator, and the left operator is not an ORDER operator, the left and right operators and their associated operands are swapped. For example, the search query "alpha & beta gamma .. delta" is reordered to "gamma .. delta alpha & beta". The swapping procedure is performed recursively on nested operators.

Step 624 constructs the header information in the granularity table 1180, including items 1181 and 1182. Step 626 constructs the list of granularities present 1183 and the granularity reset lists 1186. The granularity list provides the granularity of each word and the operator table provides the operator granularities. The pointers to the found flags 1188 of words and operators are constructed from the previously-constructed word and operator tables.

Step 626 constructs the search query in string form 1198 from the original search query. Step 630 returns program control to the calling procedure.

7. The Evaluating Phase of the Process

Figure 7:
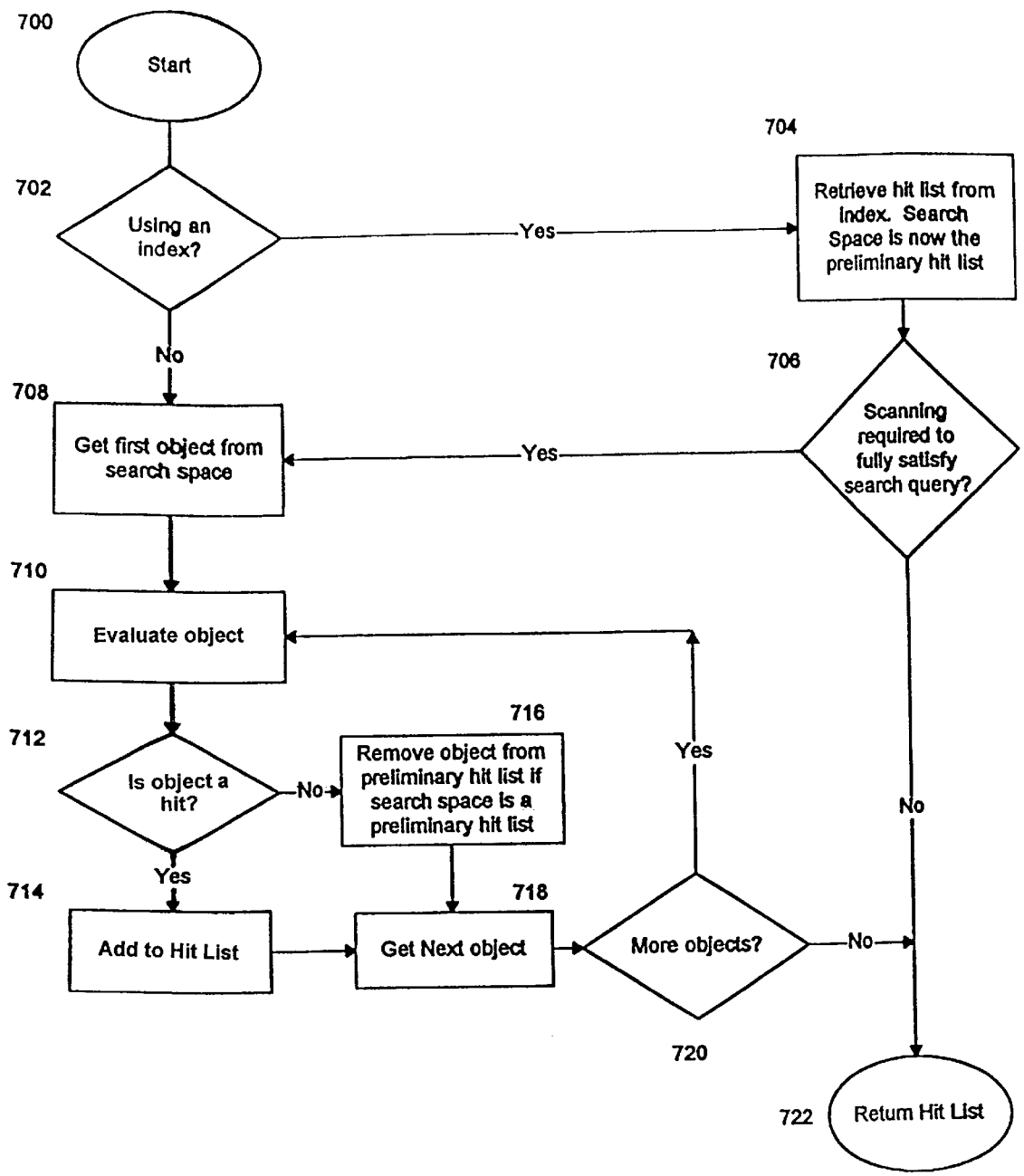
FIG. 7 shows a flow diagram of the evaluating phase of the process for rapid and multi-dimensional word searching.

In the fourth step of the process for rapid and multi-dimensional word searching, the hit list is created in the evaluating phase of the process 208. The hit list is the list of objects in the search space that satisfy the search query. Referring to FIG. 7, a flow diagram of the evaluating process is shown. The main function of the evaluating process is to scan index data, object data, or both, as needed, to resolve a search query.

Step 702 determines whether the search space specifies an index. If so, program control transfers to step 704, which retrieves a hit list from the index. For an index that lacks sufficient detail to satisfy the restrictions of a search query, a flag to induce subsequent scanning is set and the restrictions are abstracted to a level to which the index is responsive. For example, if the search query is "/line alpha beta", and the index follows page granularity, the index is insufficient to completely resolve the search query. The index can determine, however, which documents satisfy the search query "/doc alpha beta". The index constructs a preliminary hit list of objects which satisfy this abstracted search query, and thus, only a subset of objects in the original index search space are subject to scanning, the objects that contain "alpha" and "beta". Objects that do not contain these words are eliminated from further evaluating. Step 706 determines whether scanning is required to resolve the search query by looking at the flag set in steps 450, 532, 534, and/or 704. If so, program control is transferred to step 708. If scanning is not needed, the hit list generated from the index is returned to the calling procedure in step 722.

If the search space does not specify an index or the index is insufficient to completely resolve the search query, program control continues with step 708. Step 708 retrieves the first object for scanning. In the preferred embodiment, this object may originate from a file directory, a file directory and subdirectories, a disk, or preliminary hit list from step 704. In any event, this step extracts the first object and prepares it for scanning. To scan the object, step 710 calls the evaluate object procedure, which is detailed in a separate section below and shown in the flow diagram in FIG. 8.

Step 712 tests whether the object evaluated in step 710 is a hit. If so, step 714 adds the object to the hit list. If the object is not a hit but it was retrieved from an index-based preliminary hit list from step 704, step 716 removes the object from the preliminary hit list. This step ensures that objects found in an abstracted search query in step 704 are removed from the final hit list. Following step 714 or 716, step 718 retrieves the next object for scanning, as in step 708. Step 720 determines whether an object is retrieved in step 708. If so, program control loops back to step 710. If no more objects require scanning, step 722 returns the hit list to the calling procedure.

a. Evaluate Object Procedure

Figure 8:
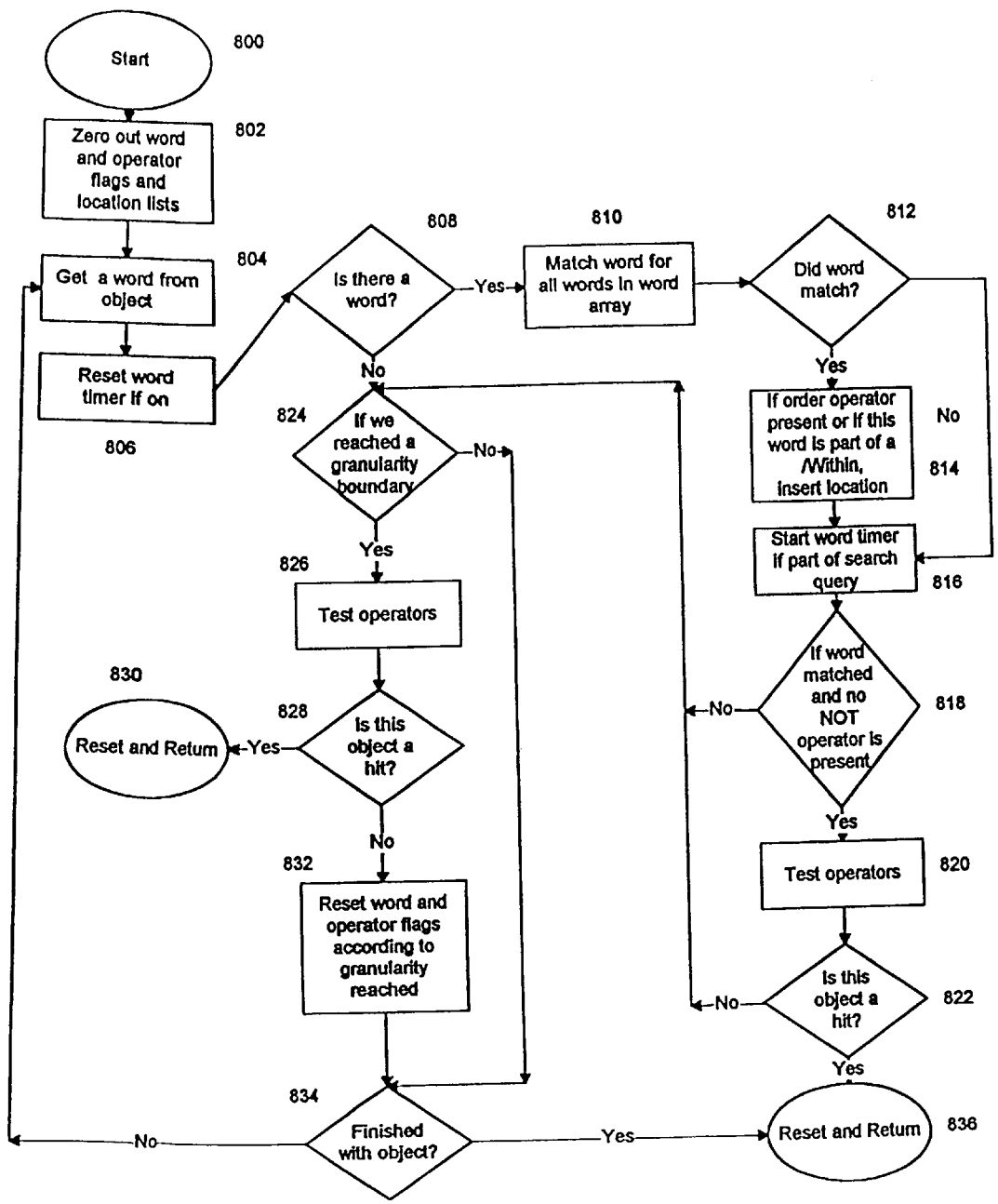
FIG. 8 shows a flow diagram of the evaluate object procedure, an element of the evaluating phase.

FIG. 8 shows a flow diagram of the evaluate object procedure. Step 802 initializes the flags. Each of the word found flags 1147, operator found flags 1169, and location pointers 1148 & 1170 in the search query data structure is zeroed. The information stored in these fields from evaluating the previous object is erased in preparation for evaluating the current object. Step 804 retrieves a word from the object. This step depends on file format, but a word usually consists of the bytes contained between two bytes representing white space. If the word timer is enabled and it has reached zero, step 806 resets it to the full word count. The word timer is enabled when a search query includes a "within" restriction and a word in the search query is found in the object evaluated. Resetting the timer sets it equal to the full minimum "within" count. Step 808 tests whether a word was read in step 804.

If a word is found in step 804, step 808 transfers program control to step 810. Step 810 determines whether the extracted word 804 matches any of the words stored in the word array 1143. In making this determination, the word matching process not only compares the text of words, but it ensures that the extracted word 804 meets the attribute restrictions stored in elements 1145 through 1155 of the word array. Included in the attributes tested are whether the extracted word 804 appears in the correct section of the object, such as on the correct page, in the document summary, in the document text, or in a summary field; whether the extracted word meets wildcard character patterns, if the extracted word is not an exact match; whether the extracted word satisfies case sensitivity restrictions; and whether date restrictions are satisfied. Although word-based restrictions are checked in step 810, restrictions moving beyond the word level are not checked. One restriction not checked is whether "within" restrictions are satisfied, as this inquiry moves beyond the word-level scope.

If a match is found in step 810, step 812 transfers program control to step 814. Step 814 tests whether an ORDER operator is present anywhere in the search query or whether the match word is part of a "within" restriction. If either of these conditions is true, the location of the match word in the object is stored in the corresponding word location list in the word array 1148. For example, if an object reads "alpha beta gamma delta", a reference to "gamma" would be marked as occurring at location "3" in the location list. Step 816 tests whether the match word is part of a "within" restriction. If so, the word timer is set to the minimum "within" number in the search query 1163, and it begins to count down each word read until zero is reached.

If a match is found in step 810 and a NOT operator is not present in the operator table, step 818 transfers control to step 820. Step 820 calls the test operators procedure, which is detailed in a separate section below and shown in the flow diagram of FIG. 9. This procedure determines whether the operator restrictions in the search query are satisfied. If so, the object is marked as a hit and step 836 returns program control to the calling procedure.

If the tests at steps 808, 818, or 822 result in a negative, program control transfers to step 824. Step 824 determines whether a granularity boundary relevant to a search has been reached, based on the granularity bitmask 1182 in the granularity table 1180. If so, step 826 calls the test operators procedure. If the object is marked as a hit, step 830 returns program control to the calling procedure. If the object is not marked a hit, step 832 resets the flags according to the granularity reached. The relevant word found flags 1147, operator found flags 1169, and location pointers 1148 & 1170 in the search query data structure are zeroed, as in step 802. Step 834 determines whether the object has been completely scanned. If so, step 836 transfers program control to the calling procedure. If scanning is not complete, program control loops to step 804 to read the next word from the object.

b. Test Operators Procedure

Figure 9:
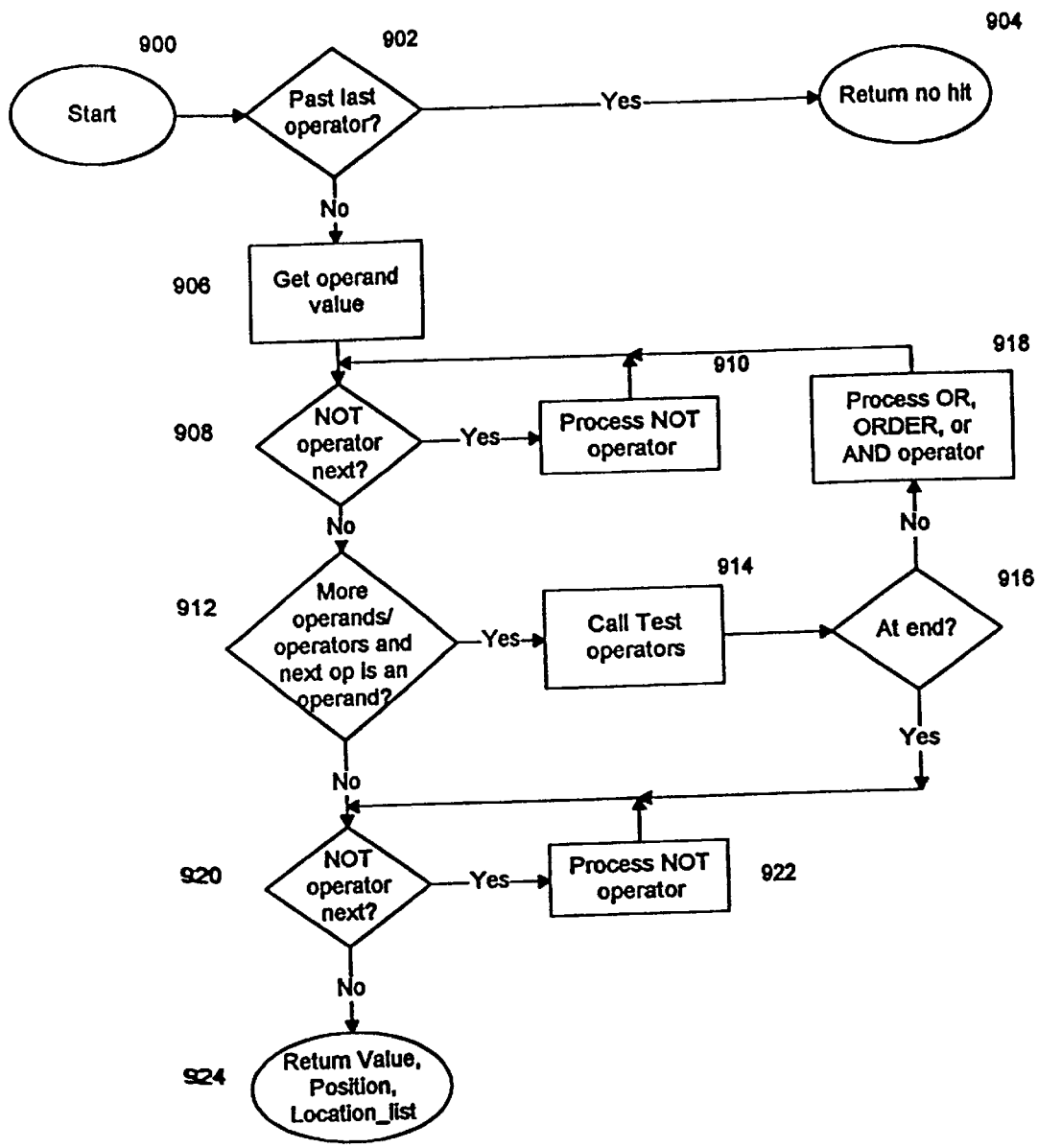
FIG. 9 shows a flow diagram of the test operators procedure, an element of the evaluating phase.
Figure 11:
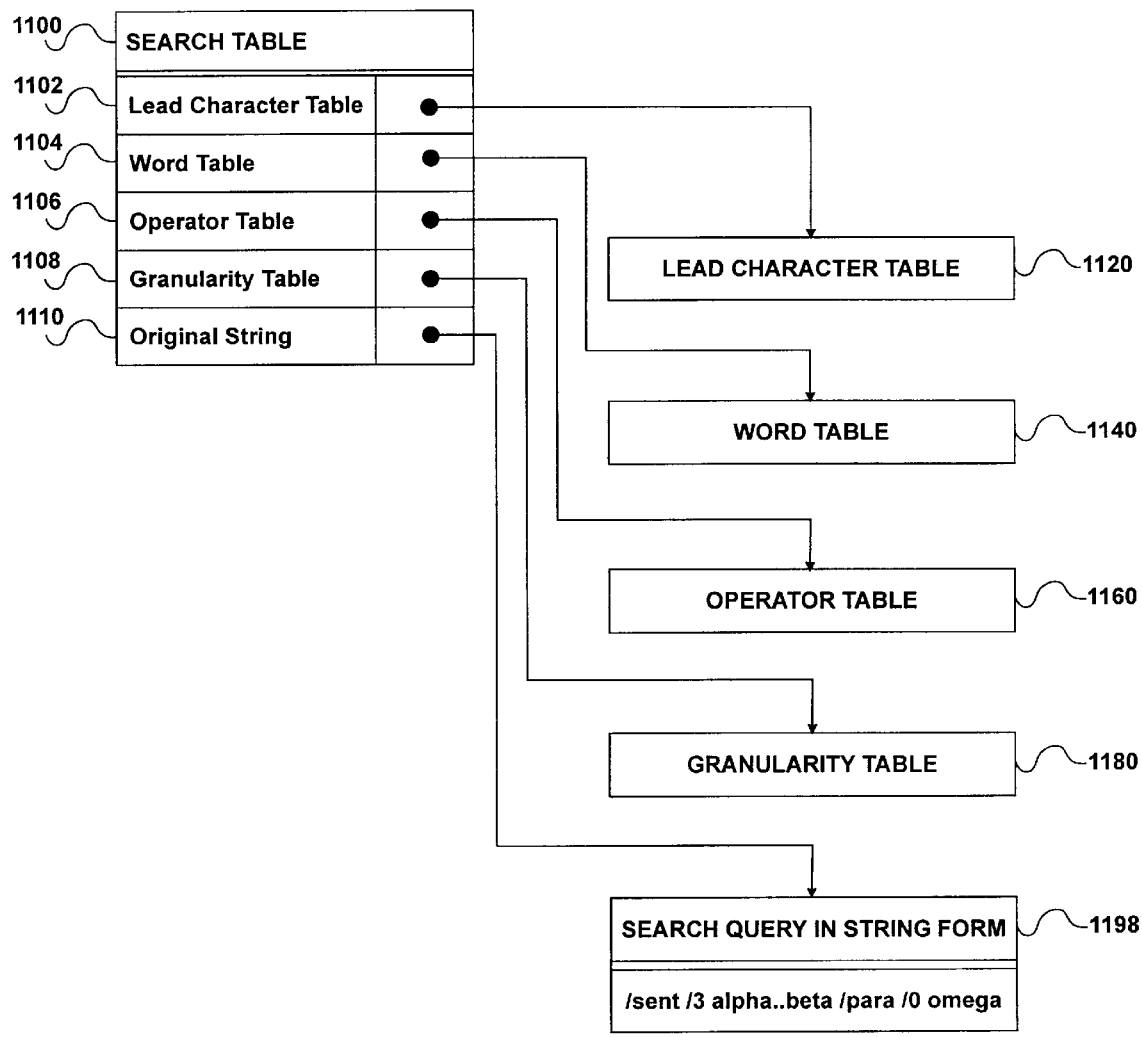
FIG. 11 shows the state of the search table data structure after completion of the parsing phase for a representative search query.

FIG. 9 shows a flow diagram of the test operators procedure. At its highest level, this procedure determines whether the operator restrictions in a search query are satisfied and whether an object is a hit. The procedure is passed one item, a pointer into the operator array ("POA"); the procedure returns three items, a boolean variable representing found status ("FOUND"), a linked list representing found locations ("LOCATION"), and POA. The variable POA is both passed and returned because it is incremented in the procedure.

When the evaluate item procedure calls the test operators procedure in steps 820 & 826, evaluate object passes as the value of POA a pointer to the first entry in the operator array 1164. Further, a call from the evaluate object procedure only uses one of the three return variables, FOUND. Recursive calls to the test operators procedure, however, require the return of the other two items, LOCATION and POA.

Step 902 determines whether POA points beyond the location of the last operator. If so, step 904 returns the fact that the object is not a hit. If POA is not beyond the location of the last operator, step 906 reads the first item pointed to in the operator array. Because of the post-fix sequence of the operator array, this item is a word. To read a word, step 906 copies into a local data structure ("OPERAND-1") the value of the word's found flag 1169 and location list 1170. After reading the word, POA is incremented to point to the next entry in the operator array 1164.

Step 908 determines whether the next item in the operator array is a NOT operator. If so, step 910 toggles the found value of OPERAND-1 and POA is incremented. For example, if the first operand is "cat", and this word is marked as found, or "true", in the current object, a trailing NOT operator would toggle the found value for this entry, making it "false". Thus, if the search query is "NOT cat", the current object with "cat" is properly marked as "false"—not a hit.

Step 912 determines whether the next item pointed to in the operator array is a word. If so, step 914 recursively calls the test operators procedure and assigns its return values to a local data structure representing a second operand ("OPERAND-2") and POA. Thus, after returning from the recursive call, POA has a new value. Step 916 determines whether POA points beyond the location of the last operator. If so, program control passes to step 920, which tests for the NOT operator. If a NOT operator is encountered, step 922 toggles the found value of OPERAND-1, as in step 910. Step 924 returns control to the calling procedure, passing the values of OPERAND-1 and POA.

If step 916 determines that the end of the operator array is not reached, program control transfers to step 918. Step 918 processes the operator presently pointed to by POA. The values of the presently pointed to operator's found flag 1169 and location list 1170 are read into a local data structure ("OPERATOR"). POA is incremented. OPERATOR is processed with its associated operands, OPERAND-1, read in step 906, and OPERAND-2, assigned in the recursive call to the test operators procedure in step 914. The result of this processing is stored in OPERAND-1. The steps performed in processing the OR, AND, and ORDER operators are detailed in the pseudo-code below.

OR:
 0. Begin.
 1. Set Temp.Found equal to the logical OR of Operand2.Found and Operator.Found.
 2. If Operator has a /Within restriction, goto step 2.1, else goto step 3.
    2.1 If Operand1.Found is true, append Operand1.Location to Operator.Location.
    2.2 If Operand2.Found is true, append Operand2.Location to Operator.Location.
 3. Set Operand1.Location equal to Operator.Location
 4. If Temp.Found is true, goto step 4.1, else goto step 5.
    4.1 Set Operand1.Found equal to true.
    4.2 Goto 6.
 5. If Operand1.Found is false, set Operand1.Location equal to zero.
 6. Set Operator.Found equal to the logical OR of Operand1.Found and Operator.Found.
 7. End.

AND:
 0. Begin.
 1. Set Operand1.Found equal to the logical AND of Operand1.Found and Operand2.Found.
 2. If the result in step 1 is true or Operator.Found is true, goto step 2.1, else goto step 6.
    2.1 If the result in step 1 is false, goto step 5.
    2.2 If Operator has no /Within restriction, goto step 3.
    2.3 If there does not exist a pair of locations fitting the required /Within number between Operand1.Location and Operand2.Location, goto step 2.6.
    2.4 Add the pair from step 2.3 to Operator.Location.
    2.5 Set Operand1.Found equal to true.
    2.6 Goto step 4.
 3. If Operand2.Location is greater than Operand1.Location, goto step 3.1, else goto step 5.
    3.1 Swap Operand1.Location and Operand2.Location
 4. If Operator has a /Order restriction, append Operand1.Location and Operand2.Location as a pair to Operator.Location.
 5. Set Operand1.Found equal to the logical OR of Operand1.Found and Operator.Found. Set Operator.Found equal to the result. Goto step 7.
 6. Set Operand1.Location equal to zero. Goto step 8.
 7. Set Operand1.Location equal to Operator.Location.
 8. End.

ORDER:
 0. Begin.
 1. If Operand1.Found and Operand2.Found are both true, goto step 2, else goto step 5.
 2. If Operator has a /Within restriction, goto step 4.
 3. If Operand1.Location or Operand2.Location are zero (the result of a NOT operator), goto step 3.3.
    3.1 If Operand1.Location is less than or equal to Operand2.Location and Operand1.Found is possibly true as a result of Operator.Found, set Operand1.Location equal to a valid location from Operator.Location.
    3.2 If Operand1.Location is greater than or equal to Operand2.Location, goto step 3.2.1, else set Operand1.Location equal to Operand2.Location and goto step 3.4.
       3.2.1 Set Operand1.Found equal to false and set Operand1.Location equal to zero. Goto step 3.4.

3.3 If Operand1.Location equals zero and Operand2.Location does not equal zero, goto step 3.3.1, else goto step 3.3.2.
    3.3.1 Set Operand1.Location equal to Operand2.Location. Goto step 3.4.
    3.3.2 If Operand1.Location does not equal zero and Operand2.Location equals zero, set Operand2.Location equal to Operand1.Location.
3.4 If Operand1.Found is true, insert the location pair in Operand1.Found in Operator.Location. Goto step 6.

4. If there does not exist a pair of locations satisfying the required /Within restriction and in the correct order as between Operand1.Location and Operand2.Location, goto step 4.2.
    4.1 Add the pair from step 4 to Operator.Location. Set Operand1.Found equal to true. Set Operand1.Location equal to Operator.Location.
    4.2 If Operand1.Found is false, set Operand1.Location equal to zero.
    4.3 Goto step 6.

5. If Operator.Found is false, goto step 5.2.
    5.1 Set Operand1.Found equal to true. Set Operand1.Location equal to the last location from Operator.Location. Goto step 6.
    5.2 If Operand1.Location is non-zero and Operand2.Location is non-zero and Operand1.Location is less than Operand2.Location, goto step 5.3, else goto step 5.4.
    5.3 Swap Operand1.Location and Operand2.Location. Set Operand1.Found equal to true. Goto step 6.
    5.4 If Operand1.Found is true and Operand1.Location is zero and Operand2.Location is non-zero, or Operand2.Found is true and Operand2.Location is zero and Operand1.Location is non-zero, goto step 5.5, else goto step 5.6.
    5.5 Set Operand1.Found equal to true. If Operand2.Location is non-zero, set Operand1.Location equal to Operand2.Location. Goto step 6.
    5.6 Set Operand1.Found equal to false. Set Operand1.Location equal to zero.

6. Set Operand1.Location equal to Operator.Location.

7. If Operand1.Found is true, set Operator.Found equal to true.

8. End.

After completion of operator processing in step 918, program control loops to step 908.

An example clarifies the recursive flow of the test operators procedure. FIG. 10 shows such an example of object evaluation for a representative search query and object. The search query 1000 specified in the example is "/13 /sent A..(B¦C)", which is shown in post-fix order in 1001. This search query finds all objects where "A" is in the same sentence, within thirteen words, and precedes either "B" or "C". The search space specifies three objects 1002, 1004, and 1006. The object subject to evaluation in the example is the second object 1004. This object satisfies the search query. As previously explained, the evaluate object procedure calls the test operators procedure in step 826 when a granularity boundary is reached in step 824. In the example of FIG. 10, the granularity boundary reached is the end of the first sentence 1008 in the scanned object 1004.

The first call to the test operators procedure passes a value of POA pointing to the first item in the operator array, the word "A" 1010. Information concerning this first call to the test operators procedure is shown in the box marked 1012. Step 906 reads "A". But because the next item in the operator array 1001 is also a word, the conditional at step 912 forces a recursive call in step 914 to the test operators procedure. In this call, POA points to the second item in the operator array, the word "B" 1014. Information concerning this second call to the test operators procedure is shown in the box marked 1016. Step 906 reads "B". But because the next item in the operator array 1001 is again a word, the conditional at step 912 forces a second recursive call in step 914 to the test operators procedure. In this call, POA points to the third item in the operator array, the word "C" 1018. Information concerning this third call to the test operators procedure is shown in the box marked 1020. Step 906 reads "C". This time, the next item in the operator array 1001 is an operator. The conditionals at steps 912 and 920 result in the negative, and the word "C" is returned in step 924 to the calling procedure, which is the second iteration of the test operators procedure. In this return, POA points to the fourth item in the operator array, the OR operator 1022.

After the recursive return, the second iteration of the test operators procedure continues processing at step 916. Because POA is not at the end of the operator array, step 918 processes the OR operator. At step 918, OPERAND-1 is "B", OPERAND-2 is "C", and OPERATOR is OR. From the pseudo-code presented above, OPERAND-1 is set to reflect the fact that the OR condition is satisfied and that the words satisfying the condition occur at locations 20 and 22. The conditionals at steps 908, 912, and 920 result in the negative, and the value of OPERAND-1 is returned in step 924 to the calling procedure, which is the first iteration of the test operators procedure. In this return, POA points to the last item in the operator array, the ORDER operator 1024.

After the recursive return, the first iteration of the test operators procedure continues processing at step 916. Because POA is not at the end of the operator array, step 918 processes the ORDER operator. At step 918, OPERAND-1 is "A", OPERAND-2 is the OR expression returned from the recursive call in step 914, and OPERATOR is ORDER. From the pseudo-code presented above, OPERAND-1 is set to reflect the fact that the ORDER condition is satisfied and that the word pair satisfying the condition occurs at locations 8 and 20. The conditionals at steps 908, 912, and 920 result in the negative, and the value of OPERAND-1 is returned in step 924 to the calling procedure, the evaluate object procedure. Here, the FOUND value equal to "true" allows step 828 to mark the item as a "hit" for inclusion in the hit list.

In this way, the present invention provides a means for performing rapid and multi-dimensional word searches. Although the invention has been shown and described in terms of a preferred embodiment, those persons skilled in the art will recognize that modifications to the preferred embodiment may be made without departing from the spirit of the invention as claimed below.

What is claimed is:

1. A computer system for performing rapid, multi-dimensional word searches comprising:

storage means for storing one or more objects and one or more indexes, the objects comprising a plurality of words, the indexes identifying a group of objects and containing information relating the objects in the group;

input means for specifying a search query and a search space, the search query comprising a multidimensional combination of words and attributes, the search space identifying one or more indexes;

parser means for creating a data structure based on the search query and the one or more indexes identified by the search space, wherein the data structure comprises:

a lead character table for partially recognizing the words contained in the search query;

a word table for storing at least the words contained in the search query;

an operator table for storing in post-fix order at least the words contained in the search query and the attributes specifying one or more boolean operators contained in the search query; and a granularity table for storing at least the attributes specifying one or more granularity restrictions contained in the search query, the granularity restrictions requiring the words to appear within one or more granularity boundaries;

evaluating means for creating a list of target objects based on the data structure and the search space, the target objects consisting of objects from the search space which satisfy the search query; and output means for displaying the list of target objects.

2. A computer system for performing rapid, multi-dimensional word searches comprising:

storage means for storing one or more objects and one or more indexes, the objects comprising a plurality of words, the indexes identifying a group of objects and containing information relating the objects in the group;

input means for specifying a search query and a search space, the search query comprising a multidimensional combination of words and attributes, the search space identifying one or more indexes;

parser means for creating a data structure based on the search query and the one or more indexes identified by the search space;

evaluating means for creating a list of target objects based on the data structure and the search space, the target objects consisting of objects from the search space which satisfy the search query, wherein the evaluating means creates the list of target objects by:

creating a preliminary list of objects based on the data structure and the information specified in the one or more indexes identified by the search space; and creating the list of target objects from the preliminary list of objects where the information specified in the one or more indexes identified by the search space fully resolves the search query; and wherein the data structure comprises:

a lead character table for partially recognizing the words contained in the search query;

a word table for storing, at least the words contained in the search query; an operator table for storing in post-fix order at least the words contained in the search query and the attributes specifying one or more boolean operators contained in the search query; and a granularity table for storing at least the attributes specifying one or more granularity restrictions contained in the search query, the granularity restrictions requiring the words to appear within one or more granularity boundaries; and output means for displaying the list of target objects.

3. A computer system for performing rapid, multi-dimensional word searches comprising:

storage means for storing one or more objects and one or more indexes, the objects comprising a plurality of words, the indexes identifying a group of objects and containing information relating the objects in the group;

input means for specifying a search query and a search space, the search query comprising a multidimensional combination of words and attributes, the search space identifying one or more indexes;

parser means for creating a data structure based on the search query and the one or more indexes identified by the search space;

evaluating means for creating a list of target objects based on the data structure and the search space, the target objects consisting of objects from the search space which satisfy the search query, wherein the evaluating means creates the list of target objects by:

creating preliminary list of objects based on the data structure and the information specified in the one or more indexes identified by the search space; and creating the list of target objects based on the data structure and the objects specified in the preliminary list of objects where the information specified in the one or more indexes identified by the search space falls to fully resolve the search query; and wherein the data structure comprises:

a lead character table for partially recognizing the words contained in the search query;

a word table for storing at least the words contained in the search query;

an operator table for storing in post-fix order at least the words contained in the search query and the attributes specifying one or more boolean operators contained in the search query; and a granularity table for storing at least the attributes specifying one or more granularity restrictions contained in the search query, the granularity restrictions requiring the words to appear within one or more granularity boundaries and output means for displaying the list of target objects.

4. A method for performing rapid, multi-dimensional word searches comprising:

storing one or more objects and one or more indexes, the objects comprising a plurality of words, the indexes identifying a group of objects and containing information relating to the objects in the group;

specifying a search query and a search space, the search query comprising a multi-dimensional combination or words and attributes, the search space identifying one or more indexes;

creating a data structure based on the search query and the one or more indexes identified by the search space, wherein the data structure comprises:

a lead character table for partially recognizing the words contained in the search query;

a word table for storing at least the words contained in the search query;

an operator table for storing in post-fix order at least the words contained in the search query and the attributes specifying one or more boolean operators contained in the search query; and a granularity table for storing at least the attributes specifying one or more granularity restrictions contained in the search query, the granularity restrictions requiring the words to appear within one or more granularity boundaries;

creating a list of target objects based on the data structure and the search space, the target objects consisting of objects from the search space which satisfy the search query; and displaying the list of target objects.

5. A method for performing rapid, multi-dimensional word searches comprising:

storing one or more objects and one or more indexes, the objects comprising a plurality of words, the indexes identifying a group of objects and containing information relating to the objects in the group;

specifying a search query and a search space, the search query comprising a multi-dimensional combination or words and attributes, the search space identifying one or more indexes;

creating a data structure based on the search query and the one or more indexes identified by the search space, wherein the data structure comprises:

a lead character table for partially recognizing, the words contained in the search query;

a word table for storing at least the words contained in the search query;

an operator table for storing in post-fix order at least the words contained in the search query and the attributes specifying one or more boolean operators contained in the search query; and a granularity table for storing at least the attributes specifying one or more granularity restrictions contained in the search query, the granularity restrictions requiring the words to appear within one or more granularity boundaries;

creating a list of target objects based on the data structure and the search space, the target objects consisting of objects from the search space which satisfy the search query, wherein creating the list of target objects comprises the steps of:

creating a preliminary list of objects based on the data structure and the information specified in the one or more indexes identified by the search space; and creating the list of target objects from the preliminary list of objects where the information specified in the one or more indexes identified by the search space fully resolves the search query;

and displaying the list of target objects.

6. A method for performing rapid, multi-dimensional word searches comprising:

storing one or more objects and one or more indexes, the objects comprising a plurality of words, the indexes identifying a group of objects and containing information relating to the objects in the group;

specifying a search query and a search space, the search query comprising a multi-dimensional combination or words and attributes, the search space identifying one or more indexes;

creating a data structure based on the search query and the one or more indexes identified by the search space, wherein the data structure comprises:

a lead character table for partially recognizing, the words contained in the search query;

a word table for storing, at least the words contained in the search query;

an operator table for storing in post-fix order at least the words contained in the search query and the attributes specifying one or more boolean operators contained in the search query; and a granularity table for storing at least the attributes specifying one or More granularity restrictions contained in the search query, the granularity restrictions requiring the words to appear within one or more granularity boundaries;

creating a list of target objects based on the data structure and the search space, the target objects consisting of objects from the search space which satisfy the search query, wherein creating the list of target objects comprises the steps of:

creating a preliminary list of objects based on the data structure and the information specified in the one or more indexes identified by the search space; and creating the list of target objects based on the data structure and the objects specified in the preliminary list of objects where the information specified in the one or more indexes identified by the search space falls to fully resolve the search query; and displaying the list of target objects.

7. A computer system for performing rapid, multi-dimensional word searches comprising:

storage means for storing one or more objects, the objects comprising a plurality of words;

input means for specifying a search query and a search space, the search query comprising a multi-dimensional combination of words and attributes, the search space identifying one or more objects;

parser means for creating a data structure based on the search query, the data structure comprising:

a lead character table for partially recognizing the words contained in the search query;

a word table for storing at least the words contained in the search query;

an operator table for storing in post-fix order at least the words contained in the search query and the attributes specifying one or more boolean operators contained in the search query; and a granularity table for storing at least the attributes specifying one or more granularity restrictions contained in the search query, the granularity restrictions requiring the words to appear within one or more granularity boundaries;

evaluating means for creating a list of target objects based on the data structure and the search space, the list of target objects consisting of objects from the search space which satisfy the search query; and output means for displaying the list of target objects.

8. The computer system of claim 7 wherein the search query limits the word search of the search space to one or more specified fields within the objects in the search space.

9. A method for performing rapid, multi-dimensional word searches comprising:

storing one or more objects, the objects comprising a plurality of words;

specifying a search query and a search space, the search query comprising a multi-dimensional combination of words and attributes, the search space identifying one or more objects;

creating a data structure based on the search query, the data structure comprising:

a lead character table for partially recognizing the words contained in the search query;

a word table for storing at least the words contained in the search query;

an operator table for storing in post-fix order at least the words contained in the search query and the attributes specifying one or more boolean operators contained in the search query; and a granularity table for storing at least the attributes specifying one or more granularity restrictions contained in the search query, the granularity restrictions requiring the words to appear within one or more granularity boundaries;

creating a list of target objects based on the data structure and the search space, the list of target objects consisting of objects from the search space which satisfy the search query; and displaying the list of target objects.

10. The computer system of claim 9 wherein the search query limits the word search of the search space to one or more specified fields within the objects in the search space.

* * * * *